(12) United States Patent
Yamamoto et al.

(10) Patent No.: US 7,473,017 B2
(45) Date of Patent: Jan. 6, 2009

(54) VEHICLE PROVIDED WITH SWITCH DEVICE

(75) Inventors: Takao Yamamoto, Wako (JP); Manabu Ichikawa, Wako (JP); Masahiro Inoue, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 72 days.

(21) Appl. No.: 11/085,222

(22) Filed: Mar. 22, 2005

(65) Prior Publication Data
US 2005/0231968 A1 Oct. 20, 2005

(30) Foreign Application Priority Data
Mar. 30, 2004 (JP) ............... 2004-099945
Mar. 30, 2004 (JP) ............... 2004-099946

(51) Int. Cl.
B62J 6/00 (2006.01)
F21V 33/00 (2006.01)
F21V 11/00 (2006.01)
F21V 21/00 (2006.01)
F21V 29/00 (2006.01)
B60Q 1/26 (2006.01)
B60Q 3/04 (2006.01)

(52) U.S. Cl. ............... 362/473; 362/542; 362/543
(58) Field of Classification Search ............... 362/473
See application file for complete search history.

(56) References Cited

U.S. PATENT DOCUMENTS

| RE28,637 | E | * | 12/1975 | Ploeger | 362/485 |
| 4,216,524 | A | * | 8/1980 | Leveraus | 362/464 |
| 4,570,078 | A | | 2/1986 | Yashima et al. | |
| 4,633,216 | A | | 12/1986 | Tsuyama | |
| 5,690,410 | A | | 11/1997 | Lin et al. | |
| 6,089,738 | A | * | 7/2000 | Ebara | 362/473 |
| 6,974,222 | B2 | * | 12/2005 | Mascadri et al. | 362/511 |

FOREIGN PATENT DOCUMENTS

| EP | 0 641 711 A | | 3/1995 |
| EP | 1 103 454 A | | 5/2001 |
| JP | 58-195915 | | 12/1983 |
| JP | 06219207 A | * | 8/1994 |
| JP | 2002-370683 | | 12/2002 |
| JP | 3466988 | | 8/2003 |

* cited by examiner

*Primary Examiner*—Ali Alavi
*Assistant Examiner*—William J Carter
(74) *Attorney, Agent, or Firm*—Westerman, Hattori, Daniels & Adrian, LLP.

(57) ABSTRACT

A vehicle including a meter panel which is arranged at a substantially center portion in the vehicle widthwise direction. A switch device is positioned on the meter panel and the switch device turns on and off a light.

8 Claims, 12 Drawing Sheets

VEHICLE PROVIDED WITH SWITCH DEVICE

FIELD OF INVENTION

The present invention relates to a vehicle, and more particularly, to a vehicle which includes a switch to be used for turning on and off a head light and includes a vehicle light unit which is provided with an aiming mechanism which can adjust the light radiation direction.

BACKGROUND OF THE INVENTION

In general, a conventional saddle-ride type vehicle such as a motorcycle or an all terrain vehicle (hereinafter referred to as "ATV"), is known which provides a switch for turning on and off a head light. For example, in JP-U-1983-195915, there is disclosed a switch device of a motorcycle which arranges a plurality of switch manipulating elements on a switch housing which is mounted on a handle pipe. A manipulating element of the switch device is of a push-button type, wherein the switch device is provided with a comparison member which surrounds the periphery of the switch manipulating element so as to enable the confirmation of a button pushed state and a button raised state.

In general, an ATV is known which has a structure capable of adjusting the light radiation direction of a lighting fixture such as a head light mounted on the vehicle. For example, in an all terrain vehicle (hereinafter referred to as "ATV") which is described in Japanese patent No. 3466988, both ends of a head lamp are rotatably pivotally supported on a lamp case in the vertical direction (upright direction), wherein it is possible to adjust the light radiation direction of the head lamp by rotating an adjusting bolt from behind the lamp case.

Further, in a motorcycle which is described in JP-A-2002-370683, an aiming shaft mounting bracket which is engaged with an upper portion of a rear outer periphery of a head light is tiltably pivotally supported in the front-to-rear direction using an aiming shaft as a fulcrum. Here, it is possible to vertically adjust the light irradiation direction of the head light by rotating an aiming bolt which is mounted on a lower portion of the rear outer periphery of the head light.

SUMMARY OF THE INVENTION

Conventionally, as described in the above-mentioned publication, the switch device of the motorcycle is of a small type which is mounted on a handle and hence, it is not easy to perform the assembling to house the switch device in the inside of a handle switch case. Thus, there has been a demand for an arrangement of the switch device which facilitates the assembling of the switch device on the vehicle.

Accordingly, it is an object of the present invention to provide a vehicle which includes a switch device which can be easily assembled.

A first aspect of the present invention includes a meter panel which is arranged at a substantially center portion in the vehicle widthwise direction, a switch device which turns on and off a light is mounted on the meter panel. This makes it is possible to easily assemble the switch device. Further, by mounting the switch device on the meter panel, an occupant can easily recognize the changeover positions of the switch device.

Another aspect of the present invention includes a head light which is mounted on a front portion of a vehicle body and an assist light which is supported on a handle and is rotated together with the handle, and the switch device is configured to change over the turning-on and the turning-off of the assist light. This makes it is possible to easily change over the turning-on and the turning-off of the assist light. Since the assist light is configured to be supported on a handle and to illuminate the steering direction, when a load is placed on vehicle front-side carriers, the light from the assist light is radiated to the load and the occupant may be dazzled with the light from the reflection light. Therefore, according to the second constitutional feature, when a loading material is placed on the carrier, the assist light is turned off by the switch device so as to prevent the reflection light and hence, it is possible to eliminate the possibility that the occupant is dazzled.

Another aspect of the present invention includes a switch device having a manipulating member which is tiltably supported on the meter panel and the changeover of the turning-on and the turning-off of the light is performed by tilting the manipulating member. Therefore, because the light can be turned on and off by tilting the manipulating member, the occupant can easily recognize the changeover state based on the tilting position of the manipulating member.

Another aspect of the present invention includes at least two indentations that are arranged in a spaced-apart manner in the tilting direction and extend in the direction orthogonal to the tilting direction are formed in the manipulating member. Accordingly, a projecting portion is formed between the indentations and hence, it is possible to perform the manipulation by allowing the projecting portion to catch a finger.

Another aspect of the present invention includes wall portions that are arranged on both sides of the manipulating member and the wall portions and the manipulating member have a same side shape. Accordingly, when the manipulating member is manipulated, that is, when the manipulating member is tilted and displaced with respect to the wall portions, depending on the displacement, a state in which the manipulating member and the wall portion is overlapped to each other and a state in which the projecting portion of the manipulating member is observed from the indentation of the wall portion are formed. Therefore, by allowing these two positions to correspond to two states of the switch device which correspond to the turning-on and the turning-off of the light, the occupant can easily recognize the changeover position of the switch from the side.

Another aspect of the present invention lies in that the manipulating member is constituted of a light transmitting material. Therefore, since the light passes through the manipulating member, for example, by arranging a light source in the inside of the manipulating member, the occupant can more easily recognize the movement of the manipulating member.

Furthermore, as described in Japanese patent No. 3466988 and JP-A-2002-370683, the aiming mechanism is configured to change the light radiation direction by rotating the adjusting bolt. However, since means which restricts the rotation terminal of the adjusting bolt is not provided, there has been a case that a nut which is engaged with the bolt is removed from the bolt due to the excessive rotation of the adjusting bolt. Accordingly, there has been a demand for the simple structure which can prevent this disengagement. Therefore, it is an object of the present invention to provide a vehicle light unit which can easily perform the prevention of disengagement or falling of a nut for aiming as well as the restriction of an adjusting range.

Another aspect of the present invention provides a vehicle light unit comprising a lighting fixture which is tiltably supported on a vehicle body frame and a cover member which covers the lighting fixture, wherein the vehicle light unit includes a nut which is supported on the lighting fixture at a position offset from the center of tilting and a light radiation direction adjusting bolt of the lighting fixture which is supported on the cover member and is fitted in the nut below the lighting fixture, for example, and the adjusting bolt has a distal end portion thereof arranged close to a vehicle body constituting part such as a clamper which collectively holds electric wires on an extension line of a vehicle body. Further, the clamper of the present invention is formed in an approximately U shape in a plan view.

Accordingly, by rotating the adjusting bolt, the position of the nut is changed and, at the same time, the lighting fixture which supports the nut is tilted so that the light radiation direction is changed. Further, when the nut is moved in the direction toward a distal end of the bolt, the nut is brought into contact with the vehicle body constituting part which is arranged on the extension line of the adjusting bolt before the nut is disengaged or falls from the adjusting bolt thus preventing the rotation of the bolt which causes the further feeding of the nut. Therefore, the disengagement of the nut can be prevented.

Particularly, it is possible to realize the prevention of the disengagement of the nut without increasing the number of parts by making use of the vehicle body constituting part having other function or usage.

Further, since the movement of the nut can be restricted by the member having the high rigidity such as the clamper which is joined to the vehicle body frame or the like, it is possible to surely prevent the falling of the nut. Particularly, since the clamper is formed in an approximately U shape, the rigidity of the clamper is enhanced.

Still further, since the nut is arranged close to a position below the lighting fixture, the nut and the adjusting bolt which is threadably engaged with the nut hardly receive the rainfall whereby there is no fear of erosion.

BRIEF DESCRIPTION OF THE DRAWINGS

A preferred embodiment of the present invention will be described with reference to the accompanying drawings, wherein.

DETAILED DESCRIPTION OF THE INVENTION

Embodiments of the present invention will be described hereinafter with reference to the accompanying drawings.

Figure 8:
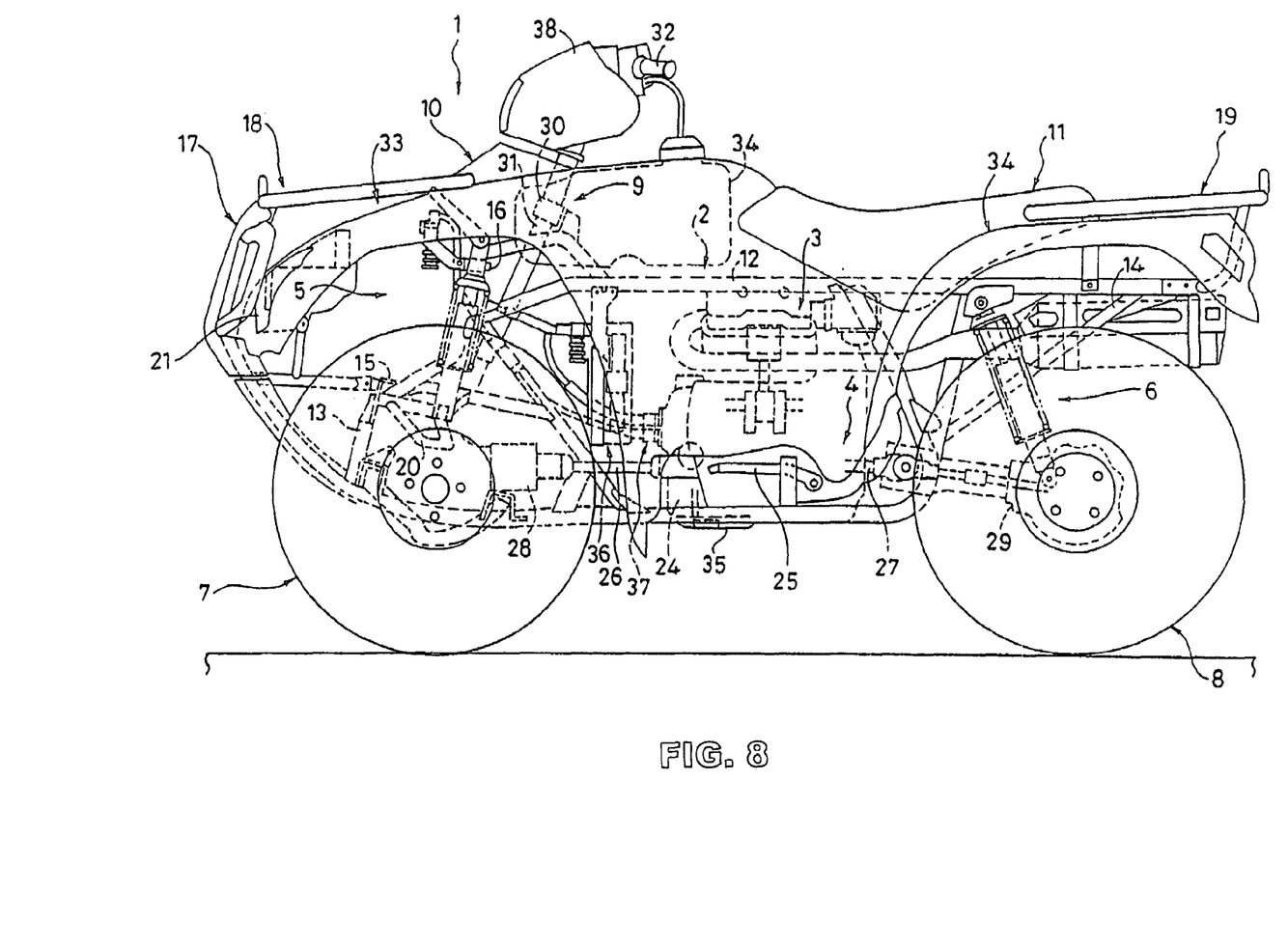
FIG. 8 is a side view of an ATV having an assist light switch and an assist light.
Figure 9:
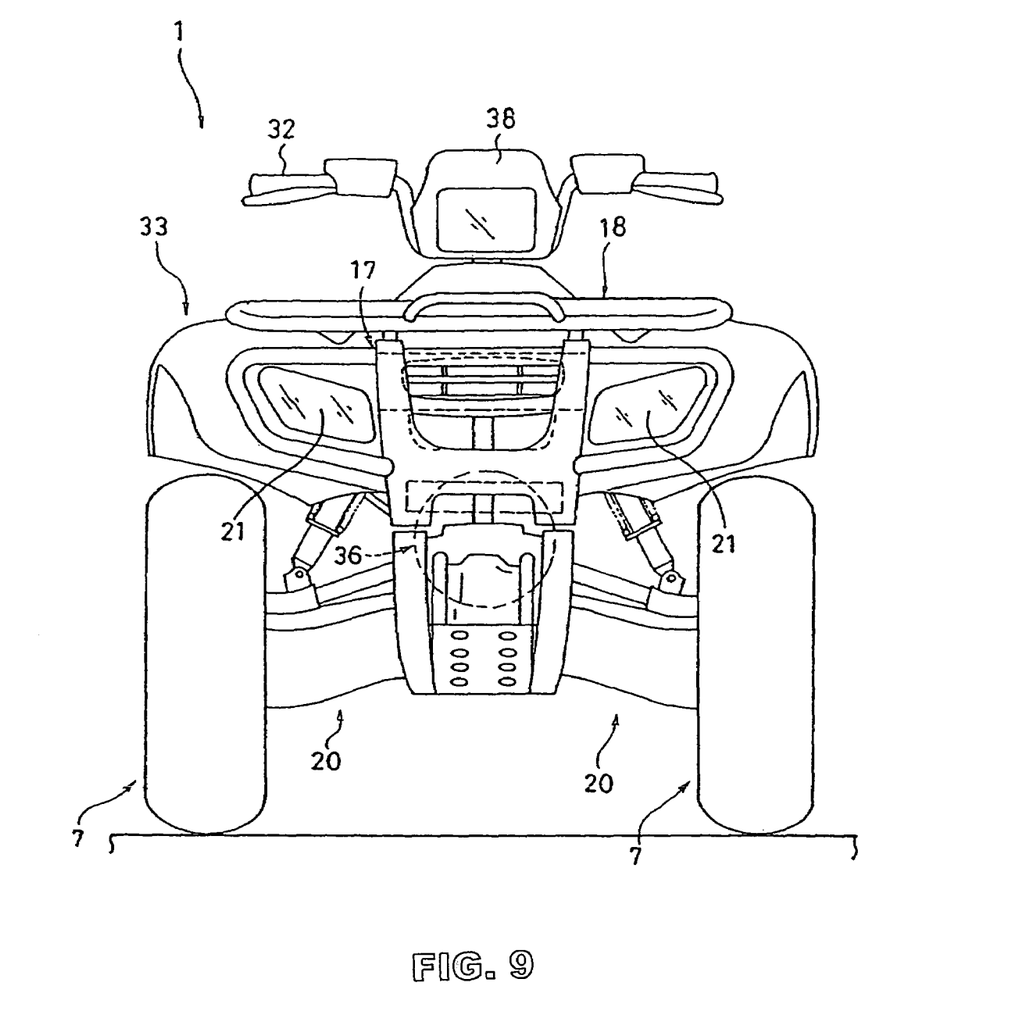
FIG. 9 is a front view of an ATV having an assist light switch and an assist light.

FIG. 8 is a side view of the ATV which mounts a switch device according to one embodiment of the present invention thereon and FIG. 9 is a front view of the ATV. The ATV 1 includes a vehicle body frame 2, a four-cycle engine 3 which is mounted on a center lower portion of the vehicle body frame 2, a power transmission device 4 which is mounted on the vehicle body frame 2 and is connected with the engine 3, and a front cushion 5 and a rear cushion 6 which tiltably hold front and rear portions of the power transmission device 4 with respect to the vehicle body frame 2. Front wheels 7, 7 are supported on left and right sides of the front portion of the power transmission device 4, while rear wheels 8, 8 are supported on left and right sides of the rear portion of the power transmission device 4 (see FIG. 9). A steering device 9 which is mounted on the vehicle body frame 2 is connected to the front wheels 7, 7. A fender 10 is mounted on the vehicle body frame 2. A seat 11 is provided above the engine 3 for allowing an occupant to drive the ATV1 in an astride manner.

The vehicle body frame 2 includes a main frame 12, a front frame 13 and a rear frame 14 which are respectively mounted in front of and behind the main frame 12, a bracket 15 which is mounted between left and right sides below the front frame 13, and a cross member 16 which is mounted between left and right sides above the front frame 13. A front guard 17 and a front carrier 18 are mounted on a front portion of the front frame 13, while a rear carrier 19 is mounted on a rear portion of the main frame 12. A pair of head lights 21, 21 is mounted on a front portion of the vehicle which is guarded by the front guard 17.

The front wheels 7 and the rear wheels 8 are respectively mounted on the vehicle body frame 2 by way of the front cushion 5 and the rear cushion 6.

The power transmission device 4 includes a transmission 24 which is capable of driving four wheels, a gear change pedal 25, and a front drive shaft 26 and a rear drive shaft 27 which are connected to front and rear portions of the transmission 24. A front final reduction gear 28 which is mounted on a front arm 20 is connected with the front drive shaft 26; while a rear final reduction gear 29 is connected with the rear drive shaft 27.

The steering device 9 includes a steering shaft 31 which is mounted on a front upper portion of the main frame 12 using a shaft holder 30, and a handle 32 which is mounted on the steering shaft 31. The fender 10 is constituted of a front cover 33 and a rear cover 34.

An oil pan 35 is arranged below the engine 3, while a cooling fan 36 which forcibly cools the engine 3 with air and a lubrication mechanism 37 are arranged in front of the engine 3.

Above the steering device 9, there is provided a member (hereinafter referred to as "meter cover") 38, wherein a front portion thereof constitutes a cover which covers a light unit having an aiming mechanism and a rear portion thereof forms a meter panel by arranging meters and the like thereon.

Figure 1:
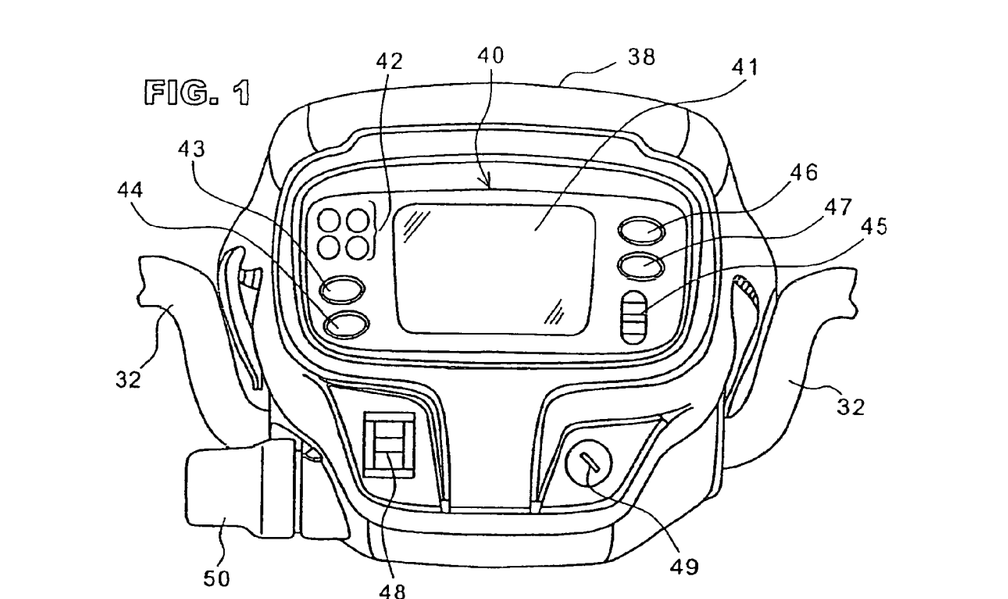
FIG. 1 is a front view of a meter cover.
Figure 2:
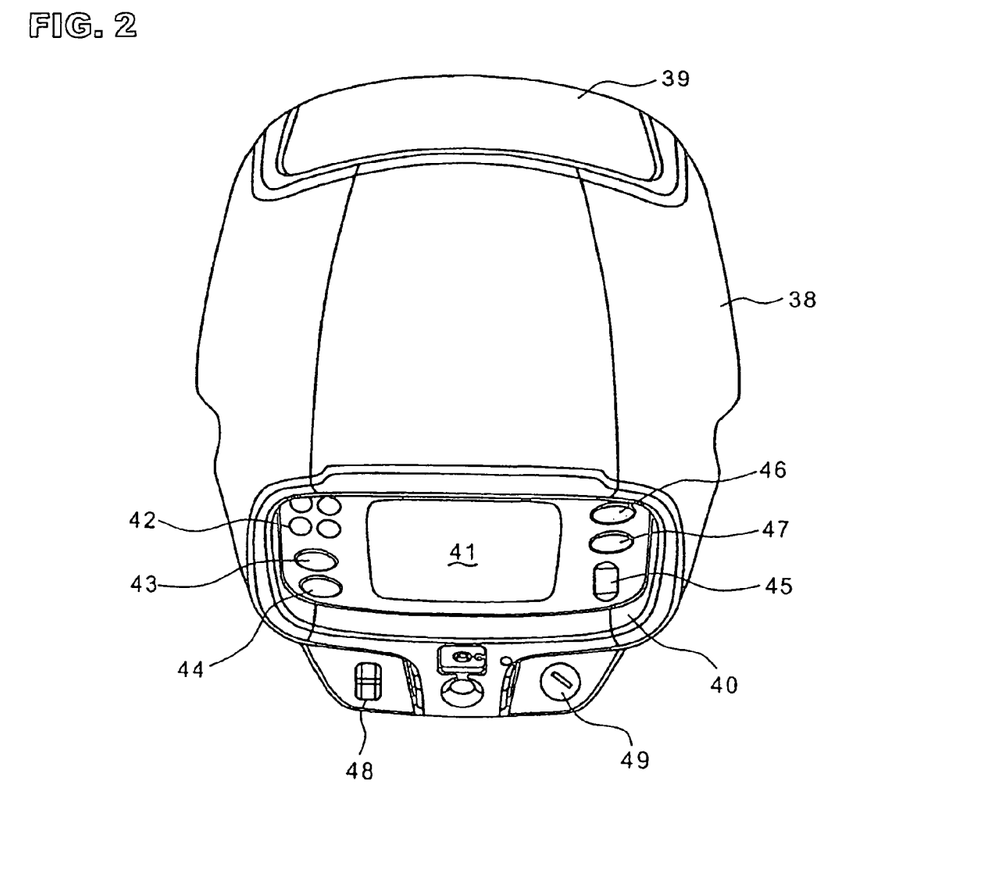
FIG. 2 a plan view of the meter cover.
Figure 3:
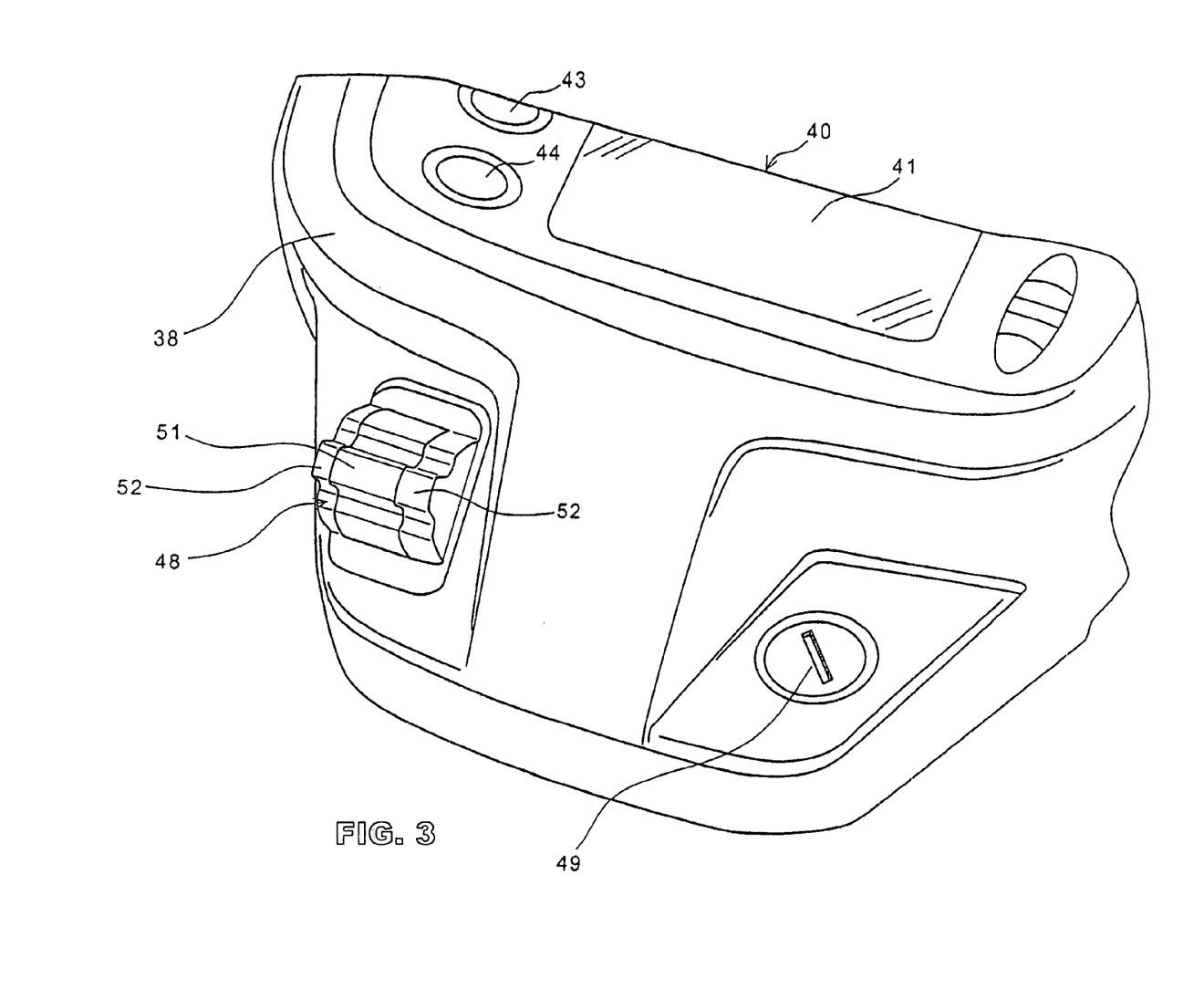
FIG. 3 is a perspective view of the meter cover.

FIG. 1 is a front view of the meter cover, FIG. 2 is a plan view of the meter cover, and FIG. 3 is a perspective view of the meter cover as viewed from the right direction. In a front portion of the meter cover 38, that is, in a front side of the vehicle in the front-to-rear direction, an assist light not shown in the drawing is incorporated. A lens 39 which covers a front surface of the assist light is provided so as to cover a front surface of the meter cover 38. On the other hand, on a rear portion of the meter cover 38, that is, on a rear side of the vehicle in the front-to-rear direction, a meter panel 40 which is arranged to face an occupant in an opposed manner is mounted.

A liquid crystal display device (LCD) 41 is arranged on a center portion of the meter panel 40. On a left side of the meter panel 40, a pilot lamp 42, a changeover switch 43 for an odometer and a trip meter, and a reset switch 44 for odometer are mounted. The pilot lamp 42 is provided for a neutral position display and a reverse display of a transmission, a four-wheel drive display and an oil temperature display. On a right side of the meter panel 40, an adjustment switch 45 for time display and selection switches 46, 47 for hour or minute are mounted. On the LCD1, it is possible to display a speed, a residual fuel quantity, a transmission changeover position, an oil exchange period, an odometer/trip meter and the like.

On the left side of and below the LCD 41, an assist light switch 48 which turns on and off the assist light is mounted, while on the right side of and below the LCD 41, a key hole 49 is arranged. On a left side surface of the meter cover 38, a knob 51 which constitutes a manipulating member of a switch for changing over the transmission is mounted.

The switch 48 is a see-saw switch or a locker switch having a tiltable shaft which can be changed over in two stages for turning on and off the assist light. The switch 48 includes a knob 51 which is configured to be tiltable about the shaft and wall portions 52 which are provided at both side surfaces of the knob 51 and ensures the easy recognition of the tilted position (change-over position) of the knob 51.

Figure 4:
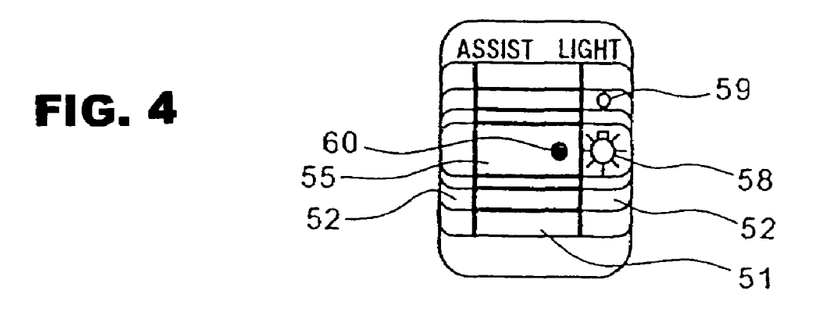
FIG. 4 a front view of an assist light switch.
Figure 5:
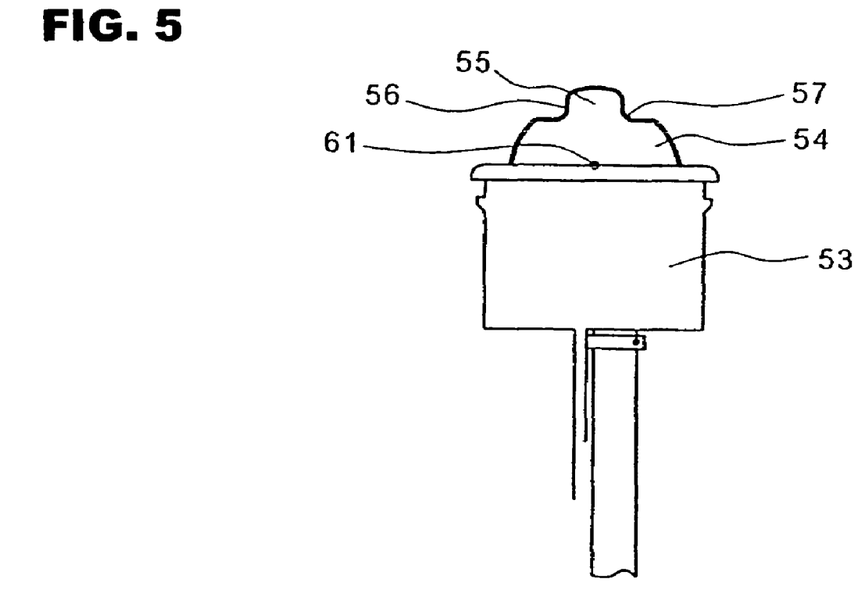
FIG. 5 is a side view of the assist light switch.
Figure 6:
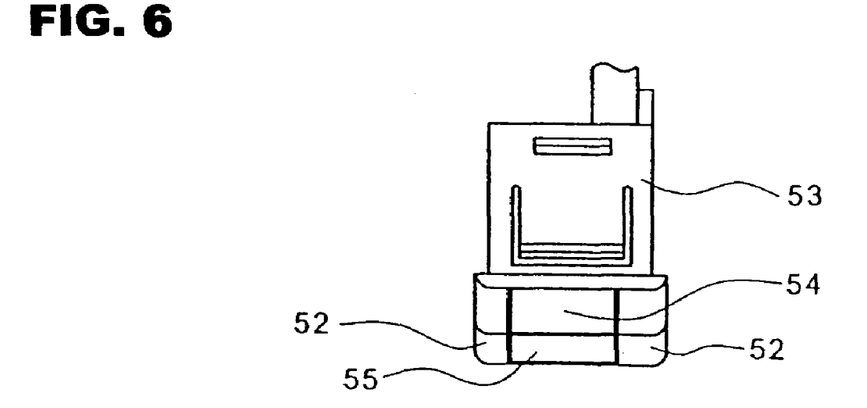
FIG. 6 is a lower plan view of the assist light switch.

FIG. 4 is a front view of the assist light switch 48, FIG. 5 is a side view of the assist light switch 48, and FIG. 6 is a lower plan view of the assist light switch 48. The wall portions 52 are integrally formed with a casing 53 of the switch 48 which is mounted on the meter cover 38. Both of the knob 51 and the wall portions 52 have a base portion 54 and a crest portion 55 and have the same shape in a side view. Between the base portion 54 and the crest portion 55, indentation portions or recessed portions 56, 57 are formed. A mark 58 indicative of the light-turning-on position is displayed on the crest portion 55 of the wall portion 52, while a mark 59 indicative of the light-turning-off position is displayed on one side (the upper side in this embodiment) of the base portion 54 of the wall portion 52. On the crest portion 55 of the knob 51, a mark 60 indicative of the constitution that the indicated portion constitutes the crest portion 55 is indicated. When the switch 48 is viewed from the front side, the occupant can distinguish whether the assist light it turned on or off based on whether the mark 60 is aligned with the mark 58 or the mark 59.

Figure 7:
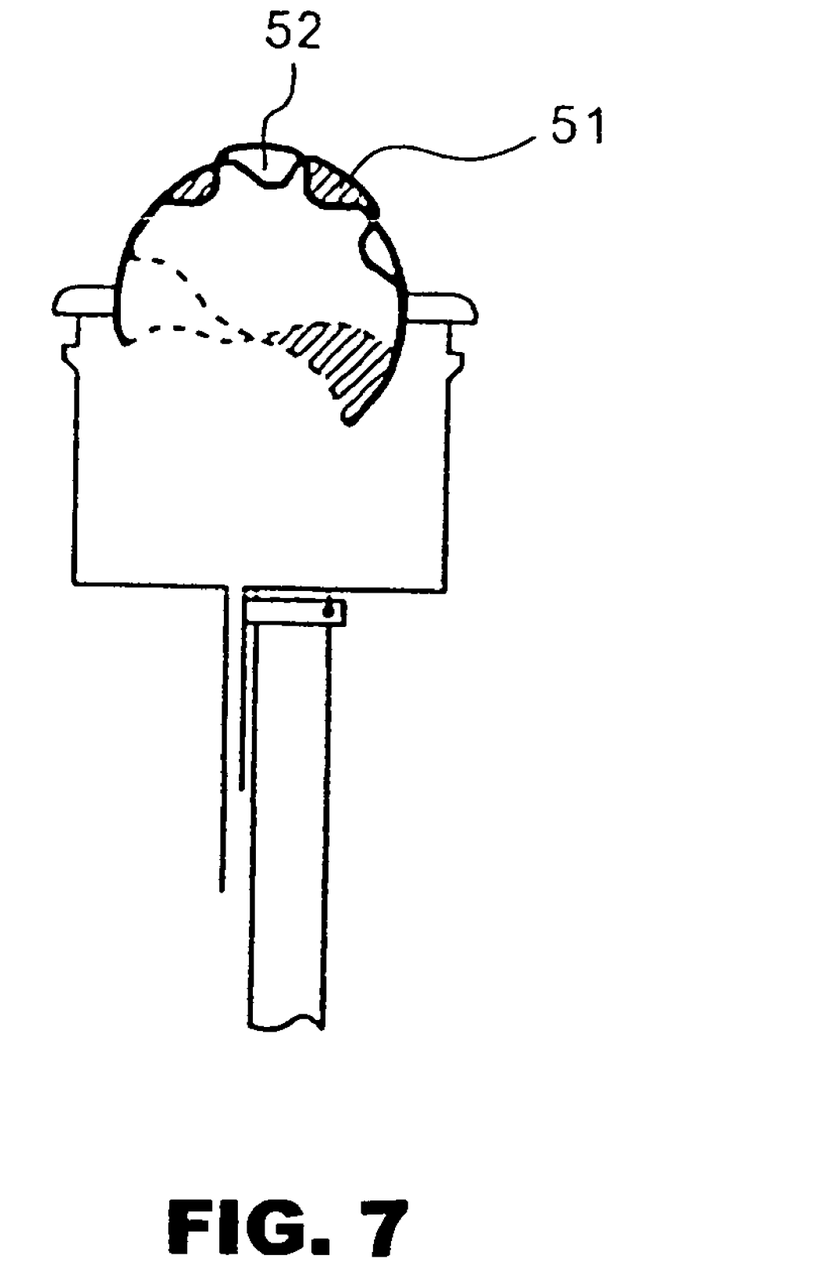
FIG. 7 is a side view of the assist light switch.

A tiltable shaft 61 which tiltably supports the knob 51 is mounted on the casing 53. When the knob 51 assumes the light-turning-on position, the knob 51 and the wall portions 52 assume the same side shape and hence, as shown in FIG. 5, the knob 51 is concealed by the wall portion 52 in a side view. On the other hand, when the knob 51 is tilted to the light-turning-off position, the knob 51 is displaced with respect to the wall portions 52 and the crest portion 55 of the knob 51 is positioned at the recessed portion 57 of the wall portion 52. FIG. 7 shows a state in which the knob is displaced with respect to the wall portion.

In this manner, according to the assist light switch 48 of this embodiment, the occupant can recognize the state that the knob 51 is tilted in the front view as well as in the side view. That is, the occupant can clearly recognize whether the knob 51 is in the light-turning-on state or in the light-turning-off state in a side view. Particularly, when the colors which are different from each other are applied to the knob 51 and the wall portions 52, the occupant can more easily recognize the crest portion 55 of the knob 51 as viewed from the recessed portion 57.

Further, with respect to the assist light switch of this embodiment, since the recessed portions 56, 57 are formed in the knob 51, that is, the crest portion 55 is formed in the knob 51, the occupant can easily manipulate the assist light switch by pinching the crest portion 55 or by engaging his/her finger with the crest portion 55 at the time of performing the manual manipulation.

Further, it is preferable that the knob 51 is formed of a light transmitting material. It is because that by providing a light source such as an LED (light emitting diode) in the inside of the knob 51, it is possible to illuminate the knob 51 using light from the inside thereof and hence, the occupant can more easily recognize the changeover position of the knob 51.

Here, in this embodiment, the vehicle having the switch device for turning on and off the assist light has been illustrated. However, the scope of application of the present invention is not limited to such an application. The present invention is applicable to a vehicle which includes a switch device for various lighting fixture (light unit) mounted on the vehicle such as a head light, a fog light and the like.

Figure 11:
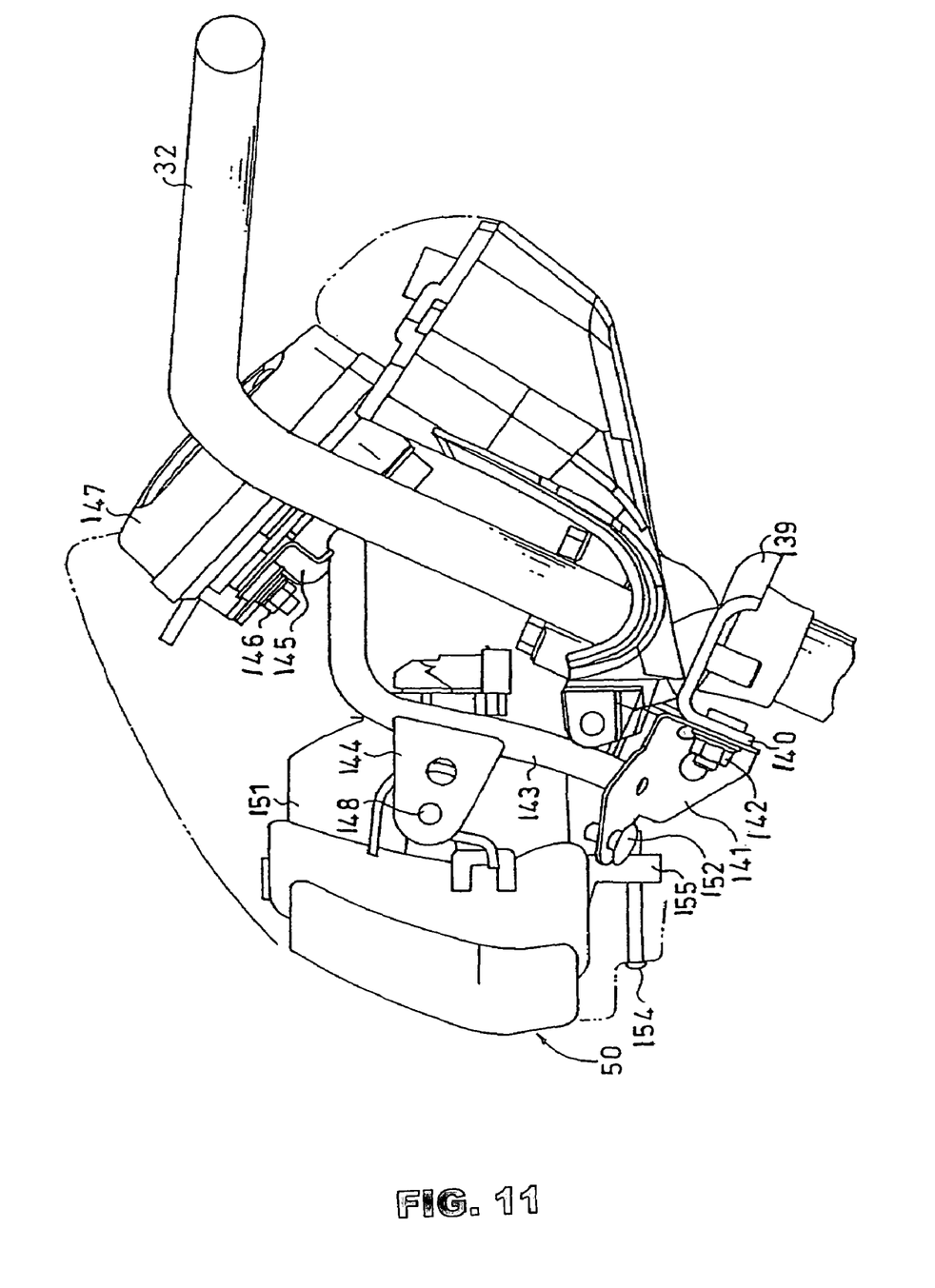
FIG. 11 is a side view of a part of an ATV1 in a state that a front portion and an upper portion of a meter cover are removed.
Figure 12:
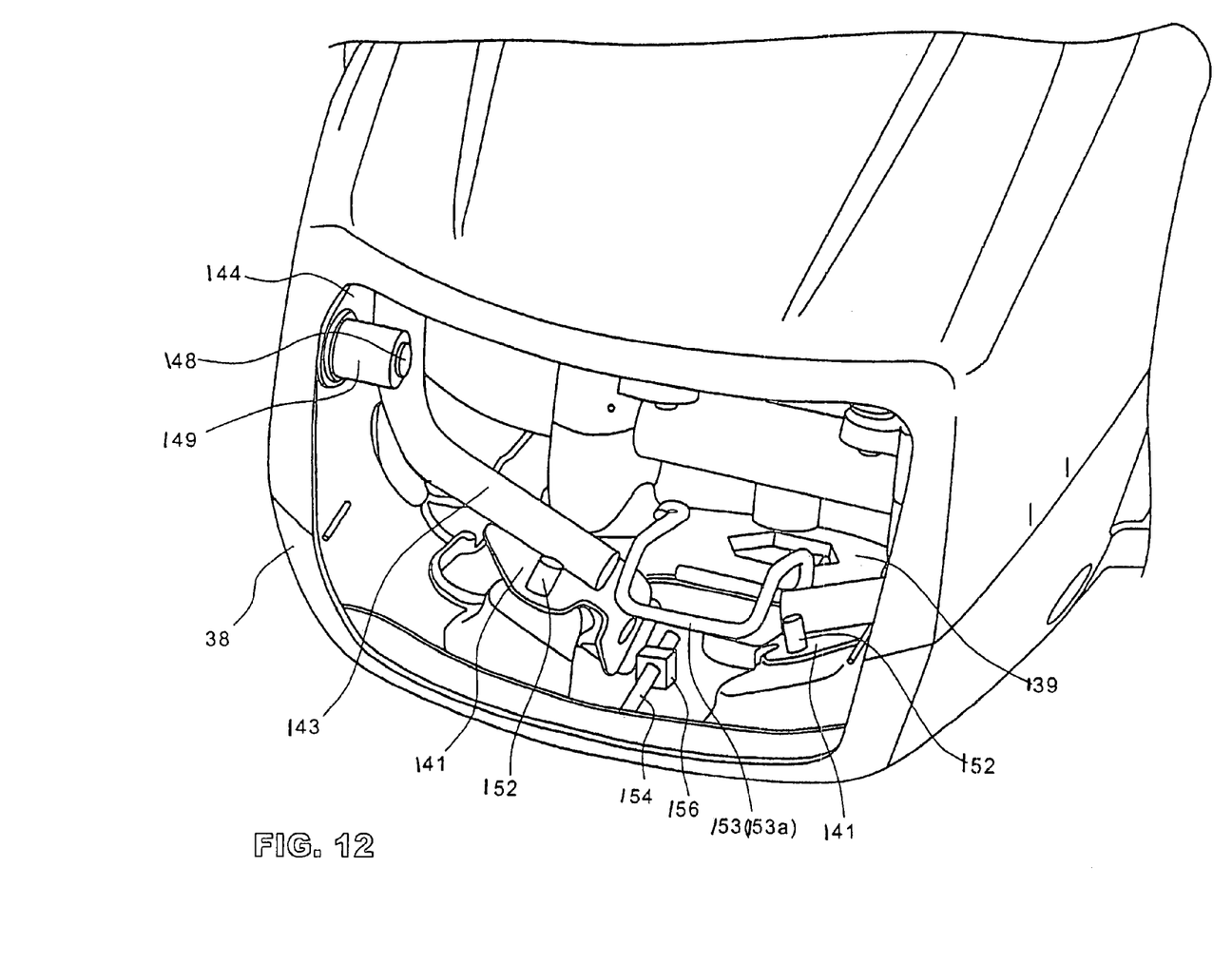
FIG. 12 is a perspective view of a part of the meter cover in a state that the assist light unit is removed.
Figure 13:
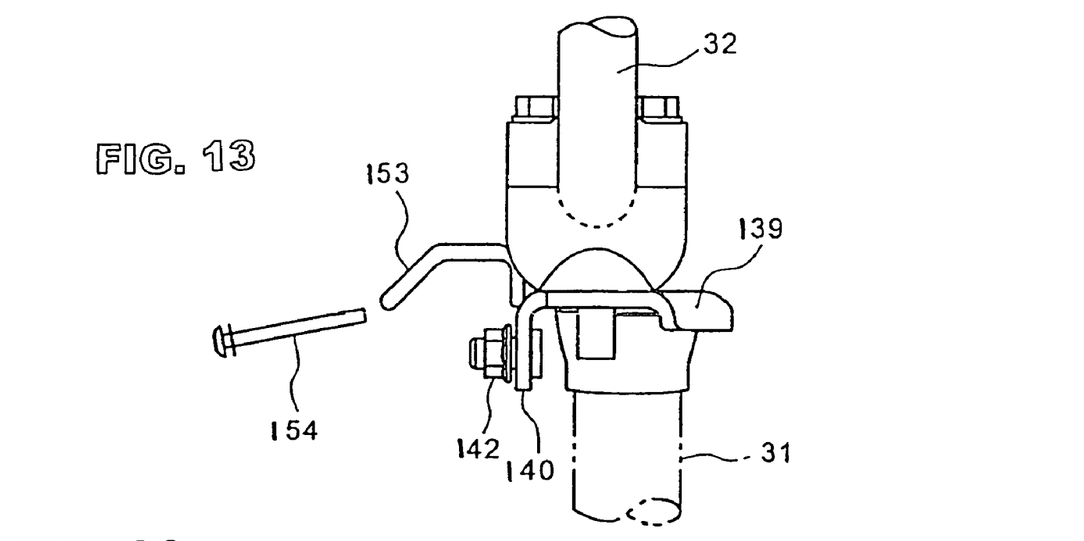
FIG. 13 is a side view of a part of a steering portion of the ATV.
Figure 14:
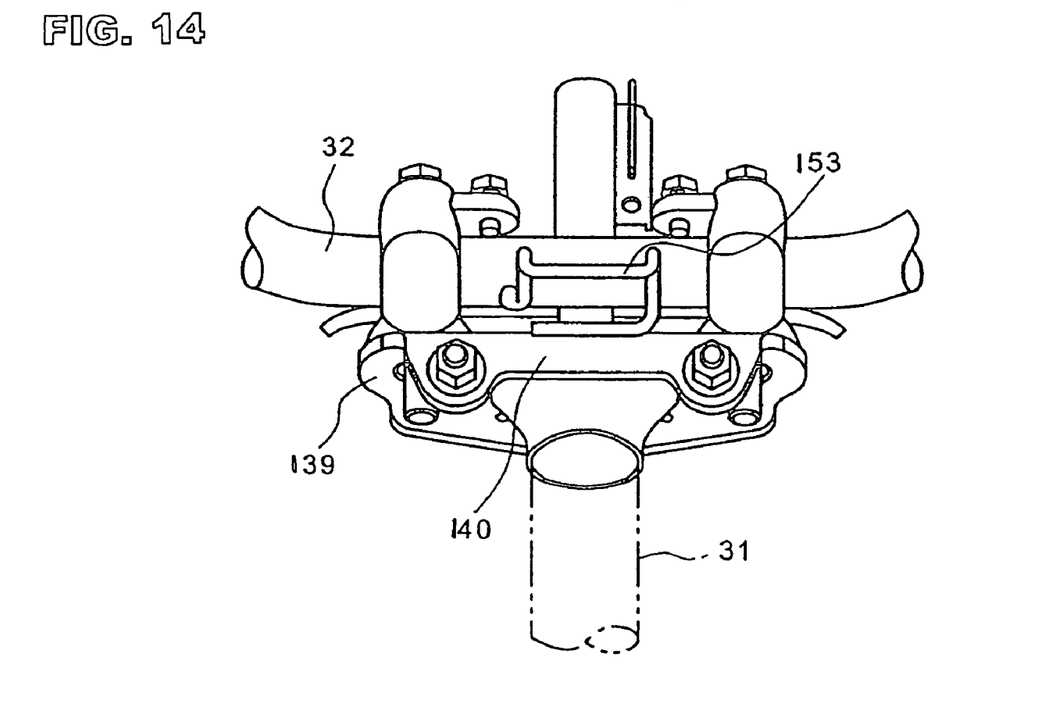
FIG. 14 is a perspective view of the steering portion of the ATV as viewed at a position below and in front of the steering portion.

FIG. 11 is a side view of the ATV1 in a state that a front portion and an upper portion of the meter cover are removed, and FIG. 12 is a perspective view of the ATV1 in a state that an assist light unit is removed. Further, FIG. 13 is a side view of a steering portion, and FIG. 14 is a perspective view of the steering portion as viewed in the lower front direction. In these drawings, a plate member 139 which is arranged substantially laterally and horizontally of the vehicle body is mounted on an upper end portion of the steering shaft 31. A handle 32 is supported on the plate member 139.

A portion (a front wall) 140 which is bent vertically is formed on a front portion of the plate member 139, while lower stays 141, 141 for mounting the meter cover are respectively joined to a front surface of the front wall 140 using bolts and nuts 142. The lower stays 141, 141 are arranged in a laterally separated manner in the vehicle widthwise direction and both ends of pipes 143 are respectively joined to upper surfaces of the lower stays 141, 141. The pipes 143 respectively extend to the outside in the vehicle widthwise direction from the lower stays 141, 141 and, thereafter, are raised upwardly. Light holding plates 144 are respectively joined to midst portions of respective raised portions (approximately vertical portions) of the pipes 143. Upper stays 145 are joined to upper portions of the pipes 143 and a meter panel 147 is mounted on the upper stays 145 by means of bolts and nuts 146.

The light holding plates 144 have pivot shafts 148 which extend toward the inside of the vehicle-body widthwise direction. Bushings 149 are mounted on an outer peripheries of the pivot shafts 148 and an assist light 50 is rotatably held by the pivot shafts 148 by way of the bushings 149. To be more specific, on outer side surfaces of a reflector (having a reflection surface which reflects light from an electric lamp mounted in the inside thereof in the frontward direction of the vehicle) 151, recessed portions (not shown in the drawing) are formed so that the bushings 149 can be engaged with the recessed portions. The bushings 149 are engaged with these recessed portions.

The meter cover 38 brings a lower surface thereof into contact with the lower stays 141 from below and is fixed to the lower stays 141 at positions in front of mounting portions of the above-mentioned pipes 143 by means of fixing jigs 152 which penetrate the meter cover 38 and the lower stays 141.

To the plate member 139, a clamper 153 which holds a bundle of electric wires (harnesses) not shown in the drawing which are arranged in the meter panel 147, the assist light 50 and the like are joined. The clamper 153 has an approximately U shape in a plan view. That is, the clamper 153 extends frontward from the plate member 139, is bent in the vehicle widthwise direction and, thereafter, is bent toward the plate member 139 side. With the use of a portion which is surrounded by the clamper 153 which is bent in a U shape and the front wall 140 of the plate member 139, the harnesses which vertically pass and extend through the portion are held.

Here, the clamper 153 is joined to the vehicle body frame including a top bridge and the like and may be formed in an annular shape together with the plate member 139 so as to allow the passing of the harnesses. Accordingly, the shape of the clamper 153 is not limited to the shape shown in FIG. 12.

On a lower portion of the meter cover 38, a bolt 154 for aiming is mounted in a state that the bolt 154 is arranged to extend in the front-to-rear direction of the vehicle body. In a nut holding portion 155 (see FIG. 10) which is formed on the reflector 151 in a state that the nut holding portion 155 projects downwardly from the reflector 151, a nut 156 shown in FIG. 11 is held in a state that the movement of the nut 156 in the rotational direction is restricted. The bolt 154 is threadably engaged with the nut 156. A front horizontal portion of the above-mentioned clamper 153 is arranged in the vehicle-body-side (vehicle-body-rear-side) extending direction and close to a distal end of the bolt 154. That is, at the time of performing the aiming manipulation, when the bolt 154 is rotated so that the nut 156 is advanced in the direction toward the distal end of the bolt 154, the nut 156 is positioned at a contact position. To be more specific, a distance between a distal end surface of the bolt 154 and clamper 153 is set smaller than a height of the nut 156 (an axial directional size of the nut). This provision is made to bring the nut 156 into contact with the above-mentioned horizontal portion of the clamper 153 before the nut 156 is removed from the bolt 154 even when the nut 156 is fed in the direction toward the distal end of the bolt 154.

Figure 15:
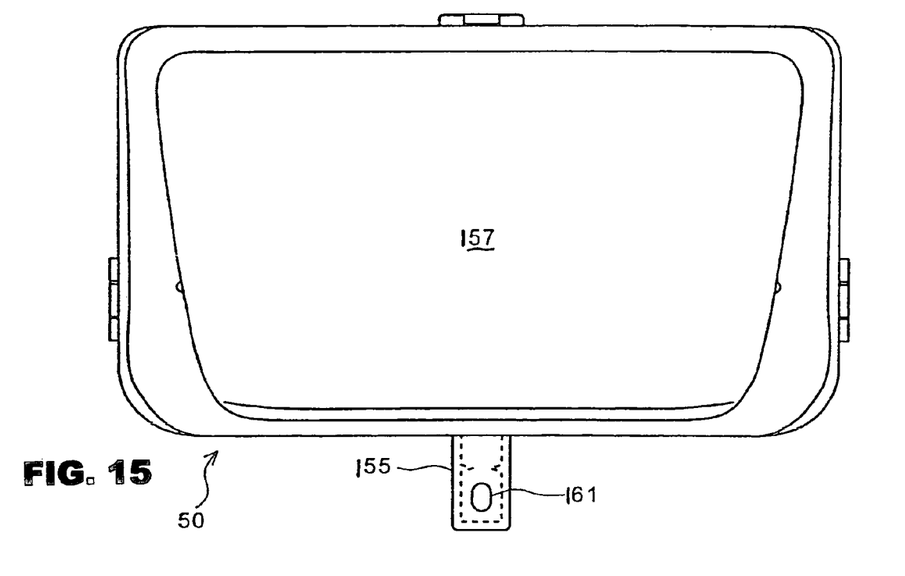
FIG. 15 is a front view of an assist light.
Figure 16:
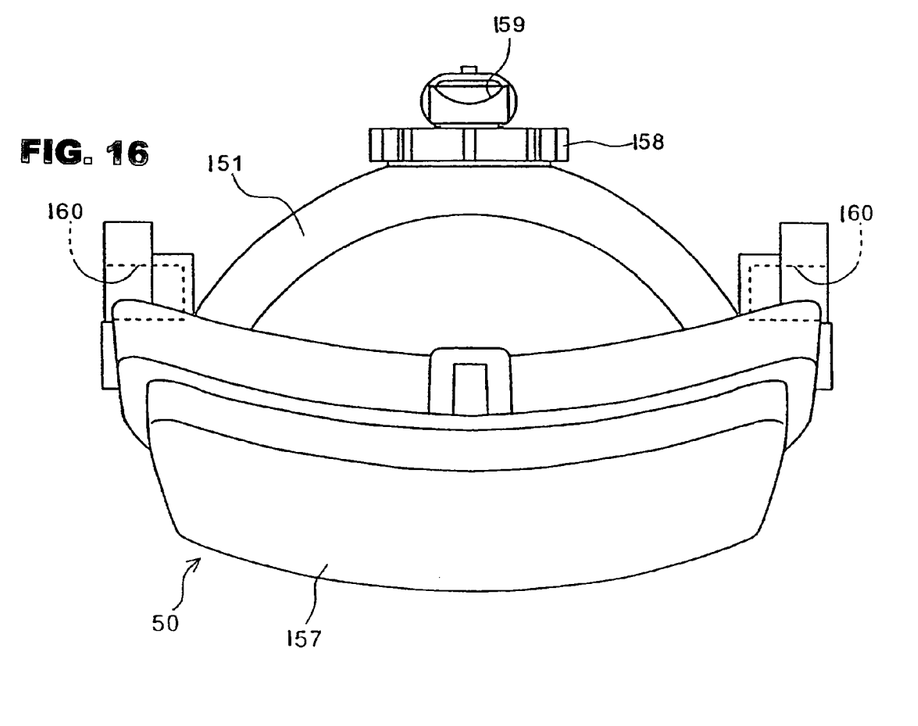
FIG. 16 is a plan view of the assist light.
Figure 17:
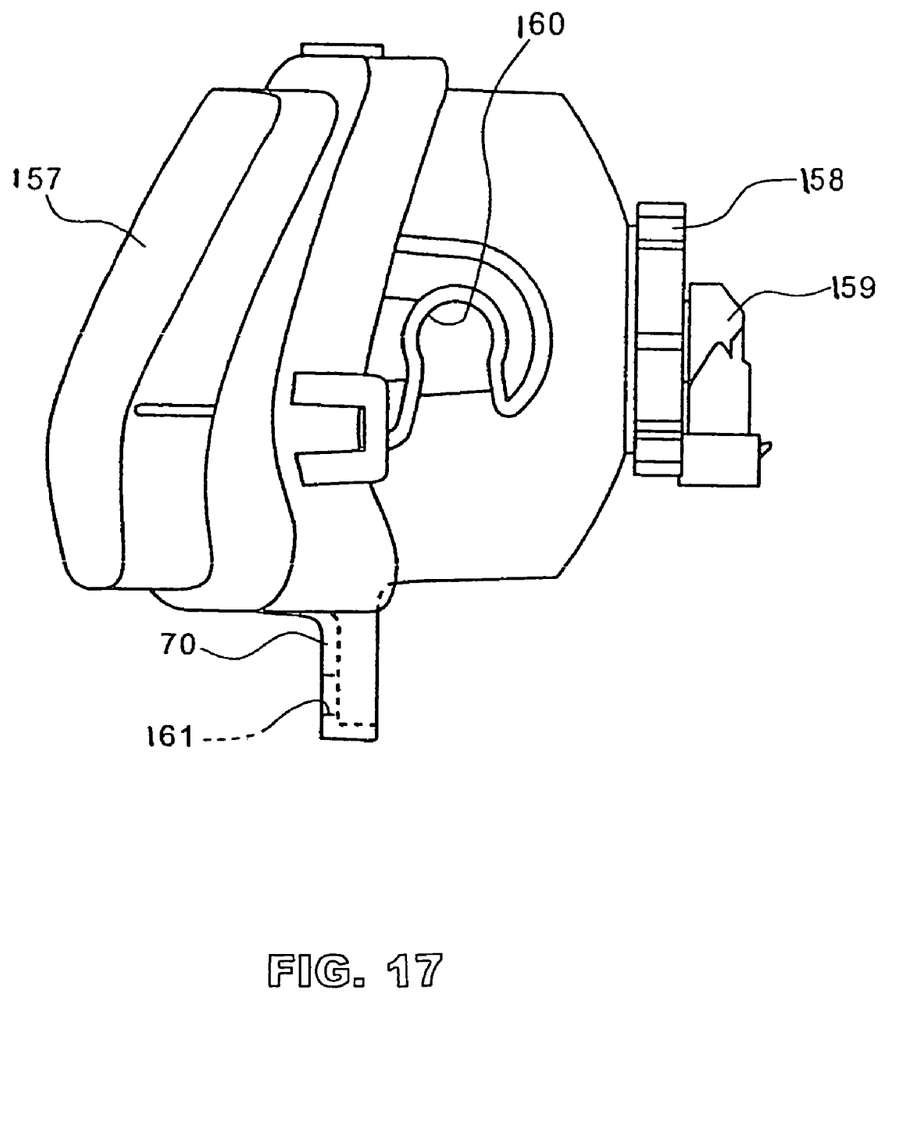
FIG. 17 is a left side view of the assist light.

FIG. 15 is a front view of the assist light, FIG. 16 is a plan view of the assist light, and FIG. 17 is a left side view of the assist light. The assist light 50 is constituted of the reflector 151, a lens 157 which is arranged in front of the reflector 151, a holder ring 158 which is formed on a rear portion of the reflector 151, and the electric lamp 159 (only a rear end thereof shown in the drawing) which is inserted into the inside of the reflector 151 from behind and is fixed to the reflector 151 by the holder ring 158. The nut holding portion 155 which is mounted on the lower surface of the reflector 151 is formed in a box shape which has a rear portion thereof opened. The nut holding portion 155 can hold the nut 156 in a state that the nut 156 is not rotated together with the bolt 154 when the bolt 154 is threadably fed. On the side surfaces of the reflector 151, the recessed portions 160 which conform to an outer diameter of the bushings 149 so as to receive the bushings 149 are formed. Holes 161 which allow the penetration of the bolts 154 are formed in the nut holding portions 155.

Figure 10:
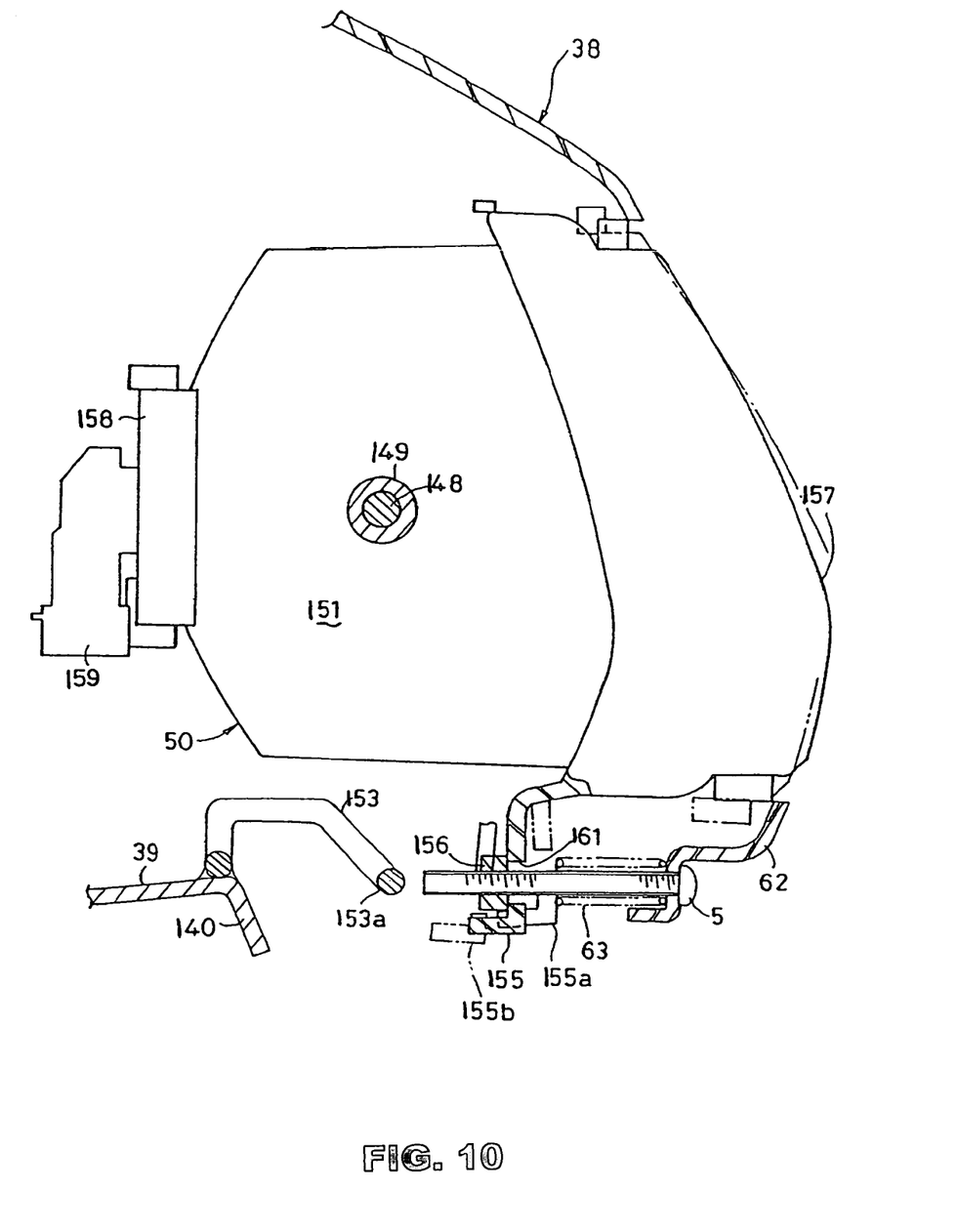
FIG. 10 is a side view of an assist light unit including an aiming mechanism.

FIG. 10 is a side view of the assist light unit which includes the aiming mechanism. In FIG. 10, the assist light 50 is supported on the meter cover 38 using the pivot shaft 148 by way of the above-mentioned bushings 149. The bolt 154 is inserted from a front surface of a lower front portion, that is, a jaw portion 62 of the meter cover 38 and a distal end of the bolt 154 penetrates the hole 161 formed in the nut holding portion 155. A coil spring 63 which acts in the direction to widen a distance between the nut holding portion 155 and the jaw portion 62 is arranged between an inner side of the front portion of the jaw portion 62 and a front surface of the nut holding portion 155. The bolt 154 is threadably engaged with the nut 156 held by the nut holding portion 155.

In this aiming mechanism, when the bolt 154 is rotated in the clockwise direction using a driver not shown in the drawing from the front side of the assist light 50, the bolt 154 is fed into the nut 156 and the nut holding portion 155 which holds the nut 156 compresses the coil spring 63 and is pulled toward the jaw portion 62 side until the nut 156 reaches a position indicated by numeral 155a. As a result, the assist light 50 is rotated about the pivot shafts 148 and hence, the light radiation direction of the assist light 50 is changed upwardly.

On the other hand, when the bolt 154 is rotated in the counterclockwise direction, the nut 156 is fed back from the bolt 154 in the direction that the nut 156 is removed from the bolt 154, the nut holding portion 155 which holds the nut 156 is pushed by the coil spring 63 and is pulled away from the jaw portion 62 side to a position indicated by numeral 155b. As a result, the assist light 50 is rotated about the pivot shafts 148 and hence, the light radiation direction of the assist light 50 is changed downwardly.

When the bolt 154 is continuously rotated such that the light radiation direction of the assist light 50 assumes the downward direction, the nut 156 is gradually moved to the distal end of the bolt 154 and the nut 156 is brought into contact with the horizontal portion 153a of the clamper 153. At this position, the feeding of the bolt 154 is restricted. Here, this movement assumes that the bolt 154 has right threads. When the bolt 154 has the left threads, it is needless to say that the movement opposite to the above-mentioned movement is performed.

In this manner, the nut 156 is brought into contact with the clamper 153 and the terminal end of the feeding of the bolt 154 is restricted by the clamper 153 and hence, a change quantity in the light radiation direction is restricted and, at the same time, it is possible to obviate the possibility that the nut 156 is removed from the bolt 154.

By restricting the limit of the feed quantity of the bolt 154 using the clamper 153, it is possible to obtain an advantage that it is unnecessary to provide a dedicated feed quantity restricting member. However, the member which restricts the feed quantity of the bolt 154 is not limited to the clamper 153. For example, to arrange the distal end of the bolt 154 close to the front wall 140 of the plate member 139, the bolt 154 may be elongated or the jaw portion 62 and the nut holding portion 155 may be arranged in a state that the jaw portion 62 and the nut holding portion 155 are displaced toward the plate member 139.

Here, although the assist light having the aiming mechanism is illustrated as the light unit in this embodiment, the scope of application of the present invention is not limited to such a case. The present invention is applicable to various lighting devices (light units) which are mounted on the vehicle including a head light, a fog light and the like.

Further, the kind of vehicle is not limited to the ATV. The present invention is applicable to all saddle-ride type vehicles including a motorcycle, a three-wheeled vehicle and the like each of which is provided with a meter panel which is arranged to face the occupant.

We claim:

1. A saddle-ride vehicle comprising:
   a meter panel arranged at a substantially center portion in the vehicle widthwise direction,
   a switch device positioned on the meter panel of the vehicle;
   a head light mounted on a front portion of a vehicle body; and an assist light supported on a handle and is rotated together with the handle, wherein said switch device comprises a manipulating member and wall portions which are arranged on both side surfaces of the manipulating member, wherein the manipulating member is tiltably supported on the meter panel, and turning-on and turning-off of the assist light is performed by tilting the manipulating member, wherein at least two indentations which are arranged in a spaced-apart manner in the tilting direction and extend in a direction orthogonal to the tilting direction are formed in the manipulating member, wherein the wall portions and the manipulating member have a same side shape when the assist light is turned on, and wherein the wall portions and the manipulating member have a different side shape when the assist light is turned off.

2. The saddle-ride vehicle according to claim 1, wherein the manipulating member is constituted of a light transmitting material.

3. The saddle-ride vehicle according to claim 1, further comprising:

a vehicle light unit comprising the assist light which is tiltably supported on the vehicle body frame and a cover member which covers the assist light, wherein the vehicle light unit comprises:

a nut supported on the lighting fixture at a position offset from the center of tilting, and a light radiation direction adjusting bolt of the assist light supported on the cover member and fitted in the nut, wherein the adjusting bolt has a distal end portion thereof arranged close to a vehicle body constituting part on an extension line of the vehicle body.

4. The saddle-ride vehicle according to claim 3, wherein the vehicle body constituting part is a damper which collectively holds electric wires of the light unit.

5. The saddle-ride vehicle according to claim 4, wherein the damper is formed in an approximately U-shape in a plan view.

6. The saddle-ride vehicle according to claim 4, wherein a distance between a distal end surface of the adjusting bolt and the damper is set smaller than a height of the nut supported on the lighting fixture.

7. The saddle-ride vehicle according to claim 3, wherein the adjusting bolt is positioned below the lighting fixture.

8. The saddle-ride vehicle according to claim 1, wherein the side shape of the manipulating member and the wall portions comprises a base portion and a crest portion.

* * * * *